United States Patent Office 2,736,747
Patented Feb. 28, 1956

1

2,736,747

BUTYLAMINE DERIVATIVES

Moses Wolf Goldberg, Upper Montclair, and Sidney Teitel, Nutley, N. J., assignors to Hoffmann-La Roche Inc., Nutley, N. J., a corporation of New Jersey No Drawing. Application September 8, 1954, Serial No. 454,828

3 Claims. (Cl. 260—563)

This invention relates to 2-methyl-4-(2,6,6-trimethyl-1-cyclohexen-1-yl)-butylamine and salts thereof, e. g. acid addition salts. This compound is useful as an antiprotozoan agent, more particularly to combat Trichomonas vaginalis. It also serves as an intermediate in the synthesis of antifungal preparations.

The novel base of this invention is produced by the reductive amination of 4-(2,6,6-trimethyl-1-cyclohexen-1-yl)-2-methylbuten-2-al-1. The synthesis is carried out, for example, by dissolving the aldehyde starting material and ammonia in an aliphatic alcohol such as methanol and adding a hydrogenation catalyst such as Raney nickel to the solution. The mixture is then hydrogenated under pressure.

Salts of 2-methyl-4-(2,6,6-trimethyl-1-cyclohexen-1-yl)-butylamine, such as acid addition salts, may be prepared by treating the base with an acid, e. g. a mineral acid such as hydrochloric acid, or a strong organic acid such as oxalic acid.

Example 1

Four teaspoons of Raney nickel catalyst were added to a solution of 310 grams (1.5 mol) of 4-(2,6,6-trimethyl-1-cyclohexen-1-yl)-2-methylbuten-2-al-1 and 200 ml. of liquid ammonia in 800 ml. of methanol. The mixture was hydrogenated at 150° C. and 1500 p. s. i. The catalyst was filtered off, the excess ammonia and methanol were distilled off, and the residual oil was fractionated in vacuo to obtain 2-methyl-4-(2,6,6-trimethyl-1-cyclohexen-1-yl)-butylamine, $b_{1.3}$ 94° C., $n_D^{28}$ 1.4850.

Example 2

An aliquot of 2-methyl-4-(2,6,6-trimethyl-1-cyclohexen-1-yl)butylamine obtained in Example 1 was treated with alcoholic hydrochloric acid. The 2-methyl-4-(2,6,6-trimethyl-1-cyclohexen-1-yl)butylamine hydrochloride thus obtained was recrystallized from acetonitrile and melted at 122–124° C.

We claim:

1. A member of the group consisting of 2-methyl-4-(2,6,6-trimethyl-1-cyclohexen-1-yl)butylamine and salts thereof.

2. 2-methyl-4-(2,6,6-trimethyl-1-cyclohexen-1-yl)butylamine.

3. 2-methyl-4-(2,6,6-trimethyl-1-cyclohexen-1-yl)butylamine hydrochloride.

References Cited in the file of this patent

UNITED STATES PATENTS

| 2,367,546 | Ullyot | Jan. 16, 1945 |
| 2,454,746 | Ullyot | Nov. 23, 1948 |
| 2,483,381 | Goldberg et al. | Sept. 27, 1949 |

OTHER REFERENCES

Haskelberg "JACS" (1948), vol. 70, pp. 2811–2.